United States Patent [19]
Pere

[11] 3,739,600
[45] June 19, 1973

[54] COUPLING FOR JOINING TWO SHAFTS LIABLE TO NON-ALIGNMENT AND TO DISPLACEMENT ALONG THEIR AXES, ABOUT A MEAN POSITION

[75] Inventor: Gerard Pere, Le Breuil, France
[73] Assignee: Creusot-Loire, Paris, France
[22] Filed: Sept. 28, 1971
[21] Appl. No.: 184,558

[52] U.S. Cl. .......................... 64/19, 64/12, 64/31, 287/85 R
[51] Int. Cl. .............................................. F16d 23/00
[58] Field of Search ............ 64/12, 31, 19, 27 NM, 64/27 R, 6, 8; 287/85 R

[56] References Cited
UNITED STATES PATENTS

| | | | |
|---|---|---|---|
| 587,019 | 7/1897 | Sperry | 64/31 |
| 2,884,772 | 5/1959 | Amberg | 64/19 |
| 3,242,693 | 3/1966 | Paulsen | 64/19 |
| 3,481,158 | 12/1969 | Mayerjak | 64/12 |
| 3,685,314 | 8/1972 | Flannelly | 64/12 |

FOREIGN PATENTS OR APPLICATIONS
900,577  7/1962  Great Britain ......................... 64/31

Primary Examiner—Charles J. Myhre
Assistant Examiner—Randall Heald
Attorney—William B. Kerkam, Jr.

[57] ABSTRACT

A coupling for joining tow shafts liable to non-alignement and to displacement along their axes, comprising a plurality of deformable articulated systems for connecting the shafts, each having a lever pivoted at its centre on a radial pivot fixed to a first shaft, and two rods of equal lengths, each pivoted at one end on one end of the lever, extending in opposite directions on each side of the lever and having their other ends pivotably connected to the second shaft, the lengths of the rods and of the lever and the positions of the pivots being selected so that the rods are substantially parallel to one another and perpendicular to the axis of the shaft to which they are connected when the shafts are in their mean relative positions.

8 Claims, 12 Drawing Figures

3,739,600
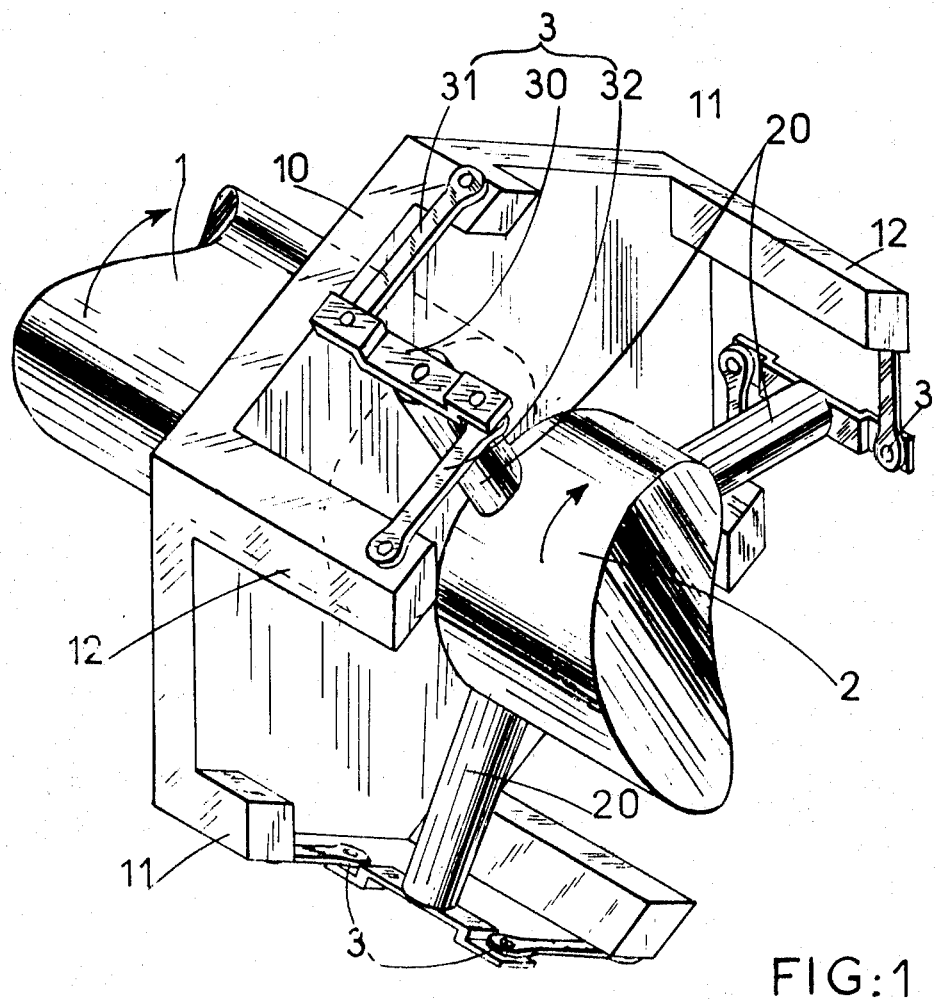
FIG:1
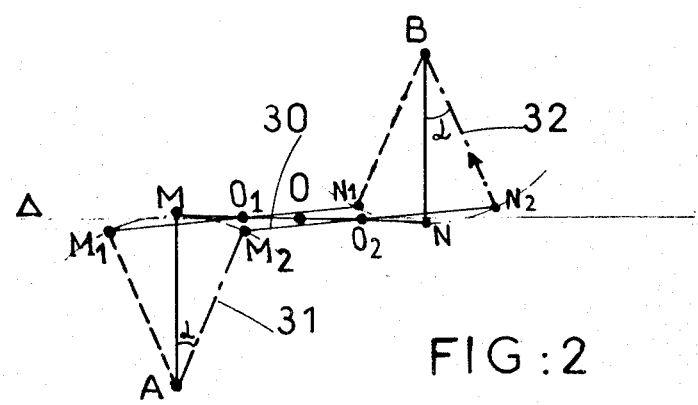
FIG:2

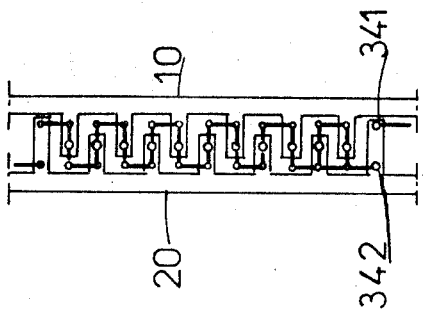
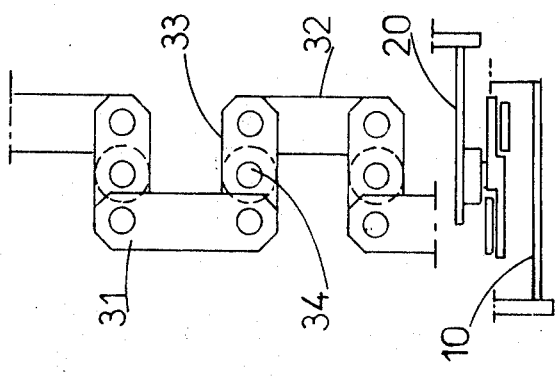
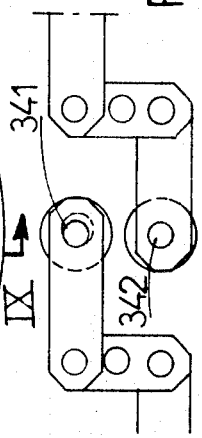
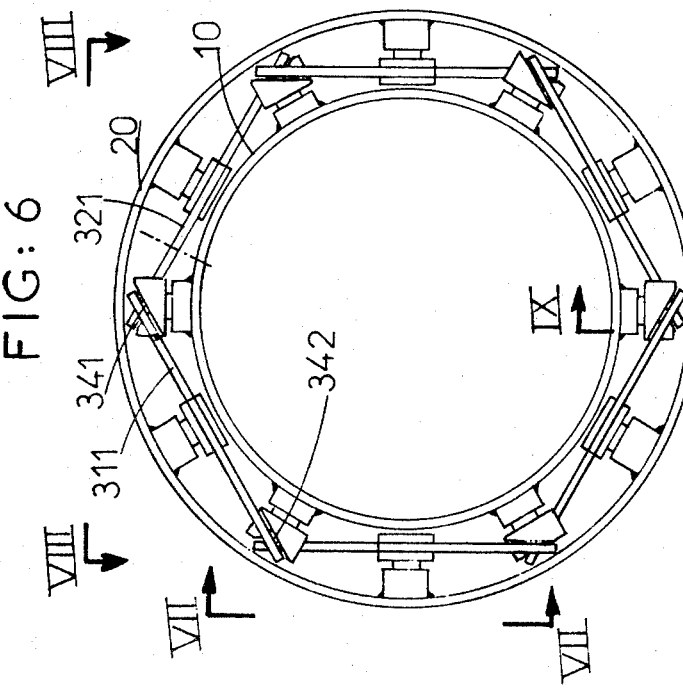

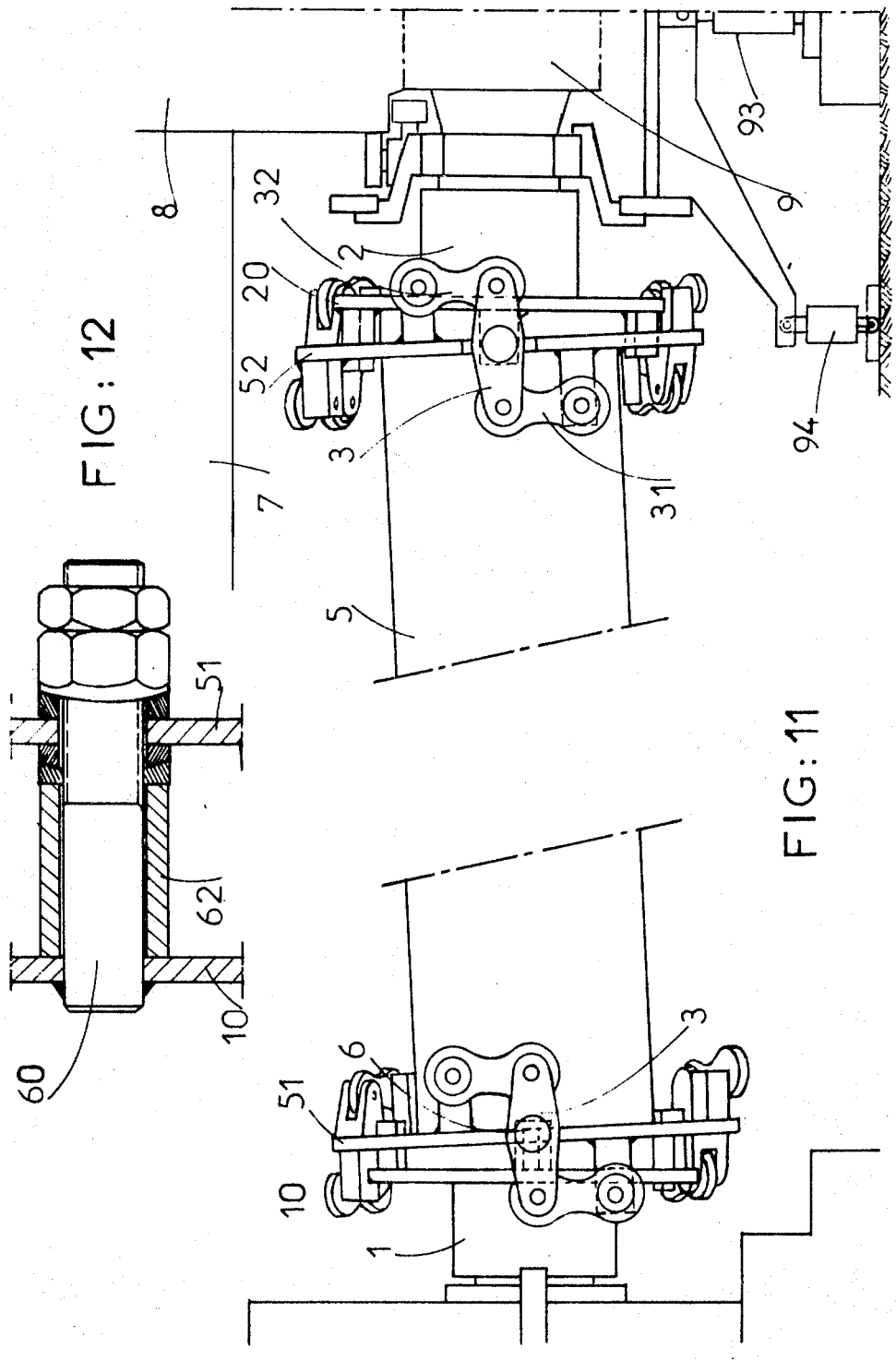

COUPLING FOR JOINING TWO SHAFTS LIABLE TO NON-ALIGNMENT AND TO DISPLACEMENT ALONG THEIR AXES, ABOUT A MEAN POSITION

The invention relates to a coupling for joining two shafts liable to non-alignment and to displacement along their axes, about a mean position.

Conventional couplings do not themselves withstand axial displacements. In general they must be used in conjunction with a sliding arrangement, for example with slots, which causes frictional stresses and is liable to wear. In conventional couplings, also displacement along the axis of one of the shafts produces a reaction along this axis, and it is therefore impossible to use couplings of this type where the driving and driven machines cannot absorb this reaction.

An object of the invention is to provide a coupling enabling relative axial dispalcements of the shafts to be absorbed without transmitting an appreciable reaction force along their axes. By means of the invention high torques can be transmitted with a single coupling member capable of absorbing axial and angular displacements of one shaft relative to the other.

According to the invention there is provided a coupling for joining two shafts liable to non-alignment and to displacement along their axes, about a mean position, comprising a plurality of deformable articulated systems for connecting the shafts, each having a lever pivoted at its centre on a radial pivot fixed to a first shaft, and two rods of equal lengths, each pivoted at one end on one end of the lever, extending in opposite directions on each side of the lever and having their other ends pivotably connected to the second shaft, the lengths of the rods and of the lever and the positions of the pivots being selected so that the rods are substantially parallel to one another and perpendicular to the axis of the shaft to which they are connected when the shafts are in their mean relative positions.

In a particularly simple embodiment, the coupling comprises at least three independent articulated systems equispaced about the axis.

In another embodiment of the invention, the articulated connecting systems are arranged one after the other to form a chain around the shafts, the pivoted connections between the rods and the second shaft being formed by rockers, each of which is pivoted at its centre on a radial pivot fixed to the second shaft and has pivoted on its ends the rods of two successive systems situated on each side of the rocker, the rockers being substantially parallel to the axis of the second shaft when the assembly is in the mean position.

The invention will now be described with reference to a plurality of particular embodiments, given by way of example and illustrated in the accompanying drawings, in which:

FIG. 1 is a diagrammatic perspective view of a coupling embodying the invention;

FIG. 2 is a diagram showing the various positions of an articulated system used in the invention;

FIG. 6 is a front elevation of a second embodiment of the coupling;

FIG. 7 is a detail seen in the direction VII—VII in FIG. 6;

FIG. 8 is a detail seen in the direction VIII—VIII in FIG. 6;

FIG. 9 is a section along a line IX—IX in FIG. 6;

FIG. 10 is a diagrammatic developed view of the coupling shown in FIG. 6;

FIG. 11 is an elevation of a particular arrangement of a coupling embodying the invention; and FIG. 12 shows a detail from FIG. 11.

Figure 5:
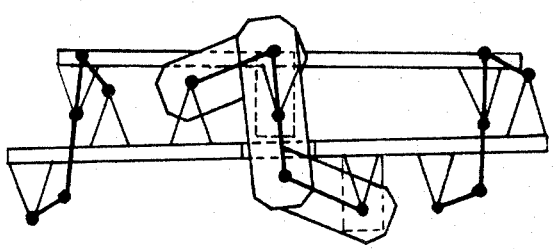
FIG. 5 is a view similar to FIG. 4, showing the coupling after angular displacement of the shafts.

The coupling is shown diagrammatically in a perspective view in FIG. 1. The driving shaft 1 is provided with a coupling plate 10 facing a coupling plate which is fixed to the driven shaft 2 and comprises, in this embodiment, three radial supports 20. A lever 30 mounted on the end of each support 20 can pivot about a central axis which is mounted on the support 20 and is perpendicular to the axis of the shaft 2. Two rods 31, 32 are pivoted on the ends of the lever 30. These rods extend on each side of the lever and their free ends are pivoted on supports 11 and 12 fixed to the coupling plate 10. The assembly formed by the lever 30 and rods 31, 32 therefore constitutes a deformable articulated system 3. Each support 20 is provided with one articulated system 3, the ends of whose rods 31, 32 are pivoted on supports 11 and 12 fixed to the plate 10.

A system 3 is illustrated diagrammatically in FIG. 2. In a system of this kind, of course, the midpoing 0 of the lever 30 has the property of being displaced, within certain limits, along a trajectory forming a substantially straight line $\Delta$. Similarly, for a given displacement of the point 0, the rods 31, 32 pivot through a substantially equal angle $\alpha$. As a result, a force applied at 0 perpendicular to $\Delta$ will produce, in the direction of $\Delta$, only a very small reaction due to the possible difference of inclination between the rods 31 and 32, this difference being very slight if certain limits are observed. In the mean position the lever MN is situated substantially along $\Delta$.

It is this property which is utilized in the coupling embodying the invention. The lengths of the rods 31, 32 and the positions of the pivots are selected so that the rods 31, 32 are parallel to one another and to the plate 10 when the two shafts are in their mean relative position. In this position the shafts are substantially in alignment, and the lever 30 is parallel to their axis and therefore substantially perpendicular to the rods 31 and 32.

When the driving shaft 1 turns on its axis it transmits, through each system 3, to each of the central pivots on the levers 30 mounted on the supports 20 a force perpendicular to its axis and to the said pivot and therefore drives the driven shaft 2 in the same direction.

If the shaft 2 is displaced axially relative to the shaft 1, the rods 31 and 32 of each articulated system 3 turn on their pivoting axes on the plate 10, through substantially equal angles on each side of the plane perpendicular to the axis of the shaft 1. Each central pivot for a rod 32 is displaced parallel to the axis, and no resulting reaction is transmitted to the shaft 1.

Figure 4:
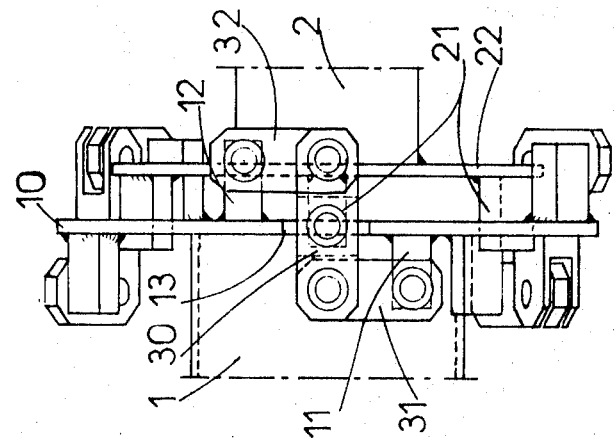
FIG. 4 is a side elevation of the coupling shown in FIG. 3.
Figure 3:
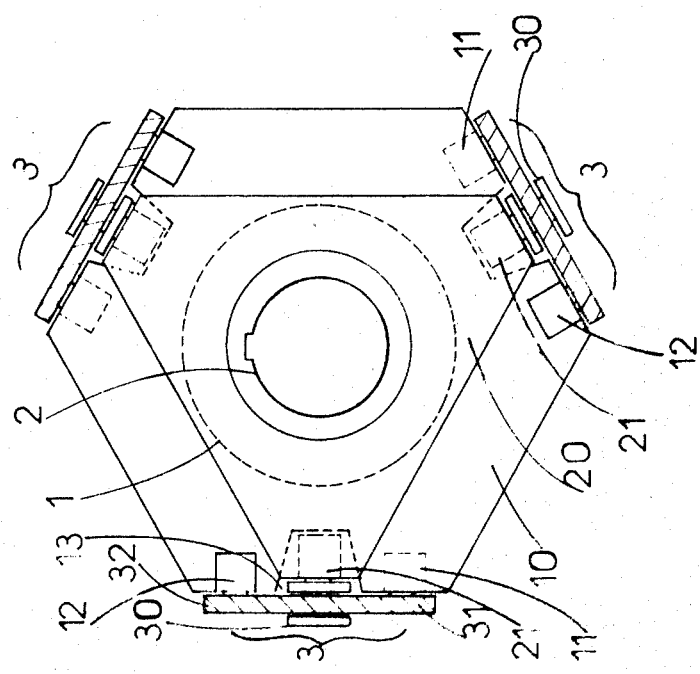
FIG. 3 is a front elevation of a coupling embodying the invention.

A particular embodiment is shown in FIGS. 3 and 4. As FIG. 3 shows, the coupling is composed of three articulated systems 3 equi-spaced about the axis. Each articulated system comprises a lever 30 mounted on a support 21 fixed to the coupling plate 22, which is fixed in turn to the shaft 2 at right angles to this shaft. The coupling plate 22 is triangular in shape.

The rods 31 and 32 pivoted on the ends of the lever 30 are pivotably mounted at their free ends on supports 11, 12 fixed on each side of the coupling plate 10 fixed to the shaft 1 and perpendicular to the latter. Recesses 13 in the plate 10 permit the supports 21 for the levers 30 to pass through.

FIG. 5 shows the position of the plates and of the articulated systems after angular displacement of the shaft 2 relative to the shaft 1. If this angular deviation is not too large, each system is deformed independently of the others to absorb the variable deviations, or difference, between the plates. The coupling described can therefore transmit rotary motion of one shaft to the other shaft even in the event of angular deviation of the shafts, provided the angle remains within certain limits, of the order of 10° around the mean position In the embodiment shown in FIGS. 6 to 9, the coupling plates 10, 20 are connected by an assembly of articulated systems arranged one after the other to form a chain around the shafts. The ends of the rods 31 and 32 in each system 3 could be connected to the coupling plate 10 directly by means of a pivot. In order to balance the forces exerted on the articulated systems and to facilitate assembly, however, the free ends of the rods 31, 32 are preferably mounted not directly on the coupling plate but on the ends of a rocker 33, which in turn is pivoted at its centre on a radial pivot 34 fixed to the coupling plate 10. Each rocker 33, therefore, receives the ends of the rods of two successive systems extending on each side of this rocker.

Since the articulated systems 3 are identical, the rockers 33 are parallel to one another.

To maintain the relative angular positions of the coupling plates, however, one rocker is omitted, and the ends of the rods of two successive systems, for example 311 and 321, are mounted on pivots 341 and 342 fixed directly to the coupling plate 10.

Where, as is usually the case, the shafts are in alignment in the mean position and the levers 30 are substantially perpendicular to the rods 31, 32 and therefore parallel to the axes of the shafts, the levers 30 and rockers 33 are parallel and are equal in length. As the diagram in FIG. 10 shows, the assembly is then completely symmetrical. However, since the pivots 341, 342 for the end rods in two successive systems are fixed directly to one joint plate, the associated rockers remain parallel to this direction when the plates move away from one another or undergo angular deviation. It will be appreciated, therefore, that the rockers 33 serve only to balance the stresses, while each articulated system remains independent of the others.

To facilitate the positioning of the assembly, one of the joints 341 and 342 connected directly to the coupling plate 10 may be mounted on an eccentric. The last rod in the articulated assembly can then be put on easily even if the various components have not been perfectly adjusted.

The joints for the rods 31, 32 on the levers 3 and rockers 33 and the joints 341, 342 for the end rods on the plate 10 are ball-mounted.

The levers 30 and rockers 33, on the other hand, are mounted on pivots perpendicular to the axes of the shafts, since these components must remain in planes parallel to the axes.

The coupling just described, in which the articulated systems are connected by rockers, enables the load on the assembly to be reduced by distributing the rotational force over a larger number of articulated systems. Also, it frees the centre of the coupling and makes it possible to drive hollow shafts or cylindrical elements of large dimensions. Where the weight and bulk of the assembly are not of primary importance, however, it is preferable to use the simpler coupling with the three systems.

Obviously, two articulated systems are sufficient to transmit the torque. A coupling with two diametrically opposite articulated systems could only be used, however, if the shafts were kept in alignment while still being capable of displacement along their axes. Where there is risk of non-alignment, it would be necessary to use the coupling with two articulated systems in conjunction with a device for centering the shafts relative to one another, for example by means of a stud fixed to one shaft an engaging a bore in the other shaft, or by means of a flexible joint which would serve solely to keep the shafts centered, without having the transmit torque.

Where there is a slight angular deviation, the two forms of coupling described may be regarded substantially as constant-velocity joints.

In the event of constant and relatively considerable non-alignment, the embodiment illustrated in FIG. 11 is advantageously used. In this case the two shafts 1 and 2 are connected by an extension 5 whose ends are provided with coupling plates 51, 52, each connected to the coupling plates 10 and 20 on the shafts 1, 2 by an assembly of articulated systems 3 as indicated above.

The set of two couplings forms a constant-velocity joint if the shafts 1 and 2 are normally parallel.

A conventional tooth-type coupling could, of course, be placed between the driving shaft 1 and the extension tube. The use of a coupling embodying the invention between the shaft 1 and extension tube, however, makes it possible to adjust the position of the latter and therefore the position of the extension tube relative to the driven shaft 2.

The position of the extension relative to one of the two shafts must, however, be maintained in some way. For this reason an axial connection 6, as shown in detail in FIG. 12, may be provided between the extension tube 5 and the shaft 1. This connection 6 comprises a bolt 60 fixed to the coupling plate 10 bearing on the coupling plate 51 by way of spherical washers. The distance between the two plates is determined by a sleeve 62.

By varying the length of the sleeve 62, the position of the extension tube 5 can be determined so that the rods 31, 32 in the articulated systems connecting the coupling plate 52 to the coupling plate 20 of the shaft 2 are parallel when the shaft 2 is in the mean position. The coupling plate 6 therefore serves as a fixed point, its position being adjustable. With a system of this kind the total length of the assembly can be modified. It can be used, for example, if the distance between the shafts of the driving and driven machines needs to be varied.

Also, by virtue of its design, the arrangement can absorb radial forces, with the result that the weight of the extension tube 5 can easily be withstood.

The coupling just described is particularly useful where a driven shaft can be displaced along its axis and, in particular where it cannot absorb reactions due to the displacement, as is the case when the driven shaft serves to drive a floating pinion. In particular, it may be used to drive rotary kilns, which are subject to expansion and to longitudinal displacement, or grinders or for rolling mills.

In the embodiment shown in FIG. 11, the element which is to be driven, for example a rotary kiln 7, is provided with a toothed rim 8 meshing with a pinion 9 mounted in a housing, which may be provided in a known manner with rollers supported on cylindrical bearing surfaces coaxial with the rim, the whole being applied to the rim by a resilient member 93. In this case it is useful to provide means for balancing the weight of the coupling and of the extension, such as a counterweight or a resilient strut 94 pivoted on a lever attached to the housing and bearing on the support block.

By means of the coupling described it is possible to transmit a considerable torque to the pionion 9, at a low speed. A fixed reducing gear can be used, therefore, instead of fixing the gear to the movable housing and so making the latter heavy.

The movable assembly, thus made lighter and balanced and not receiving any axial reaction from the coupling in the event of longitudinal displacement of the element 7, follows displacement and deformation of the rim freely, ensuring that the pinion meshes satisfactorily with the rim.

Obviously, the invention is not restricted to the details of the various embodiments described, which may be modified without exceeding the scope of the invention.

For example, some circumferential resilience might be introduced if necessary by mounting some of the joints on "SILENTBLOCS". Alternatively, this resilience might be provided by a suitable plate design.

A coupling of this kind has the advantage of using only articulated joints and not sliding components, so that wear and maintence are reduced to a minimum.

I claim:

1. A coupling for joining two shafts liable to non-alignment and to displacement along their axes, about a mean position, comprising a plurality of deformable articulated systems for connecting the shafts, each having a lever pivoted at its centre on a radial pivot fixed to a first shaft, and two rods of equal lengths, each pivoted at one end on one end of the lever, extending in opposite directions on each side of the lever and having their other ends pivotably connected to the second shaft, the lengths of the rods and of the lever and the positions of the pivots being selected so that the rods are substantially parallel to one another and perpendicular to the axis of the shaft to which they are connected when the shafts are in their mean relative positions.

2. A coupling as claimed in claim 1, in which the shafts are in alignment, comprising two articulated systems symmetrical relative to the axis and a device for centering the shafts relative to one another.

3. A coupling as claimed in claim 1, comprising at least three independent articulated systems equispaced about the axis.

4. A coupling as claimed in claim 1, wherein the articulated connecting systems are arranged one after the other to form a chain around the shafts, the pivoted connections between the rods and the second shaft being formed by rockers, each of which is pivoted at its centre on a radial pivot fixed to the second shaft and has pivoted on its ends the rods of two successive systems situated on each side of the rocker, the rockers being substantially parallel to the axis of the second shaft when the assembly is in the mean position.

5. A coupling as claimed in claim 4, wherein one of the rockers is omitted, the ends of the associated rods being pivoted directly on the second shaft.

6. A coupling as claimed in claim 1, wherein the ends of one of the rods connected directly to the second shaft is mounted on an eccentric.

7. A coupling as claimed in claim 1, further comprising an extension which is situated between the two shafts and of which each end is connected to the end of the associated shaft by an assembly of articulated systems.

8. A coupling as claimed in claim 7, wherein it connects a fixed reducing gear to a pinion for driving a toothed rim mounted in a housing equipped in a known manner with rollers supported on cylindrical bearing surfaces coaxial with the rim, and comprising means for balancing the weight of the extension and of the coupling.

* * * * *